US012629733B2

(12) United States Patent
Federmann et al.

(10) Patent No.: US 12,629,733 B2
(45) Date of Patent: May 19, 2026

(54) EXTRACTOR HOOD AND METHOD FOR OPERATING AN EXTRACTOR HOOD

(71) Applicant: BSH Hausgeräte GmbH, Munich (DE)

(72) Inventors: Marc Federmann, Sternenfels (DE); Axel Glasbrenner, Bretten (DE); Ilhan Güclü, Bretten (DE); Markus Hochmann, Karlsruhe (DE); Stefan Schrumpf, Bretten-Gölshausen (DE); Jochen Schuhmacher, Oberhausen (DE)

(73) Assignee: BSH Hausgeräte GmbH, Munich (DE)

( * ) Notice: Subject to any disclaimer, the term of this patent is extended or adjusted under 35 U.S.C. 154(b) by 458 days.

(21) Appl. No.: 17/917,007

(22) PCT Filed: May 5, 2021

(86) PCT No.: PCT/EP2021/061839
§ 371 (c)(1),
(2) Date: Oct. 5, 2022

(87) PCT Pub. No.: WO2021/228649
PCT Pub. Date: Nov. 18, 2021

(65) Prior Publication Data
US 2023/0182182 A1 Jun. 15, 2023

(30) Foreign Application Priority Data
May 12, 2020 (DE) ......................... 102020205974.8

(51) Int. Cl.
*B08B 15/02* (2006.01)
*F24C 15/20* (2006.01)

(52) U.S. Cl.
CPC .......... *B08B 15/02* (2013.01); *F24C 15/2021* (2013.01)

(58) Field of Classification Search
CPC ...... B08B 15/02; F24C 15/2021; F24C 15/20; F24F 140/40
(Continued)

(56) References Cited

U.S. PATENT DOCUMENTS

2006/0048525 A1* 3/2006 Cook ...................... F24F 13/15 236/51
2007/0221199 A1 9/2007 Hake
(Continued)

FOREIGN PATENT DOCUMENTS

CN 103851666 A1 6/2014
CN 104089315 A 10/2014
(Continued)

OTHER PUBLICATIONS

Machine Translation of CN 108488855 (Year: 2018).*
(Continued)

*Primary Examiner* — Allen R. B. Schult
*Assistant Examiner* — Amy E Carter
(74) *Attorney, Agent, or Firm* — Michael E. Tschupp; Andre Pallapies; Brandon G. Braun

(57) ABSTRACT

An extractor hood includes a functional unit, a control unit designed to control the functional unit, a hood body, a flap pivotably fastened to the hood body, and a sensor arranged on the flap and designed to detect a state of the flap. The sensor is embodied as an acceleration sensor and connected to the control unit such that the functional unit is controlled by the control unit based on the detected state of the flap.

18 Claims, 2 Drawing Sheets

(58) Field of Classification Search
USPC ........................ 126/299 D, 299 R; 454/49–67
See application file for complete search history.

(56) References Cited

U.S. PATENT DOCUMENTS

| | | | | |
|---|---|---|---|---|
| 2010/0200576 | A1* | 8/2010 | Song | F24C 15/2092 454/338 |
| 2011/0160914 | A1* | 6/2011 | Kennett | G05B 15/02 700/276 |
| 2018/0203475 | A1* | 7/2018 | Van Derven | F24F 11/47 |

FOREIGN PATENT DOCUMENTS

| | | | | | |
|---|---|---|---|---|---|
| CN | 102767857 | B | | 6/2015 | |
| CN | 106123067 | A | | 11/2016 | |
| CN | 206430219 | U | | 8/2017 | |
| CN | 108488855 | A | * | 9/2018 | F24C 15/2085 |
| CN | 109405015 | A | * | 3/2019 | F24C 15/2021 |
| CN | 208652662 | U | | 3/2019 | |
| CN | 110260381 | A | | 9/2019 | |
| CN | 110594821 | A | * | 12/2019 | F24C 15/2021 |
| DE | 1020006005806 | A1 | * | 8/2007 | F24C 15/2092 |
| EP | 2816295 | A2 | | 12/2014 | |
| EP | 3235546 | A1 | | 10/2017 | |
| EP | 3680560 | B1 | | 8/2023 | |
| TW | 200726945 | A | | 7/2007 | |
| TW | 1294954 | B | * | 3/2008 | |

OTHER PUBLICATIONS

Machine Translation of CN 109405015 (Year: 2019).*
Machine Translation of CN 110594821 (Year: 2019).*
Machine Translation of TW I294954 (Year: 2008).*
International Search Report PCT/EP2021/061839 dated Jul. 22, 2021.
National Search Report EP 21726338.3 dated May 2, 2024.
National Search Report CN 202180034853.5 dated Mar. 24, 2025.
1 National Search Report CN 202180034853.5 dated Sep. 1, 2025.
National Search Report CN 202180034853.5 dated Mar. 11, 2026.

* cited by examiner

EXTRACTOR HOOD AND METHOD FOR OPERATING AN EXTRACTOR HOOD

CROSS-REFERENCES TO RELATED APPLICATIONS

This application is the U.S. National Stage of International Application No. PCT/EP2021/061839, filed May 5, 2021, which designated the United States and has been published as International Publication No. WO 2021/228649 A1 and which claims the priority of German Patent Application, Serial No. 10 2020 205 974.8, filed May 12, 2020, pursuant to 35 U.S.C. 119(a)-(d).

The contents of International Application No. PCT/EP2021/061839 and German Patent Application, Serial No. 10 2020 205 974.8 are incorporated herein by reference in their entireties as if fully set forth herein.

BACKGROUND OF THE INVENTION

The present invention relates to an extractor hood and a method for operating an extractor hood.

It is known to use extractor hoods, which are mounted above a hob, for cleaning away fumes and vapors. Known extractor hoods generally have a hood body which may also be denoted as a screen and in which filter elements may be provided. A fan is provided above the hood body or even partially in the hood body, said fan also being able to be denoted as a blower and via which air is able to be suctioned into the hood body. In order to be able to suction fumes and vapors rising from the hob in a reliable manner, it is known to provide on the hood body a flap which serves as an air guidance element and by which the surface area of the hood body may be increased if required or via which vapors may be prevented from flowing past the hood body. Additionally, a flap which serves as a holder or panel for a control panel may also be provided on an extractor hood.

Switches may be used in order to detect whether the flap is in the closed, i.e. folded-in, state. For example microswitches or limit switches or even reed switches are known as switches. These switches may be actuated when the closed state is reached. The switches are mechanically fastened in any manner to the air guidance element or the hood body. The switch has to be switched by a mechanical actuation, or in the case of a reed switch by a magnet. In the known solutions, generally only one position of the flap may be reliably evaluated. In particular, when the flap is open it is detected that the flap is not closed since the switch is not actuated. However, no information is obtained about whether the flap is completely folded out, for example. If the flap is closed, this is detected by the actuation of the switch.

A disadvantage of the known extractor hoods and the available mechanisms for detecting the state of the flap is that firstly they have to have a complex construction and secondly only two states of the flap may be detected (open/closed).

BRIEF SUMMARY OF THE INVENTION

It is thus the object of the present invention to provide a solution in which the operation of the extractor hood is simplified, with a simple construction of the extractor hood.

The invention is based on the recognition that this object may be achieved by specific states of a flap being taken into consideration for the actuation of the extractor hood.

According to a first aspect, the object is thus achieved by an extractor hood which has a control unit for controlling at least one functional unit of the extractor hood, a hood body and at least one flap pivotably fastened to the hood body. The extractor hood is characterized in that at least one sensor for detecting the state of the flap is arranged on the flap, that the sensor is an acceleration sensor and is connected to the control unit of the extractor hood such that at least one functional unit of the extractor hood is controlled by the control unit on the basis of the detected state of the flap.

An extractor device which is mounted above a hob is denoted as an extractor hood. The extractor hood may be, for example, a chimney hood, an undermount hood, an integrated hood or a slimline hood. An extractor hood is denoted as a chimney hood in which at the top an extractor housing, in which at least one part of the fan of the extractor hood is received, adjoins the hood body which may also be denoted as a screen. The screen in this case may have a box shape. In this case, the extractor hood is also denoted as a box chimney hood. The screen may be arranged, however, in an inclined manner. In this case, the extractor hood may also be denoted as a sloping chimney hood.

According to the invention, the part of the extractor hood via which air is suctioned and conducted into the interior of the extractor hood is denoted as the hood body or screen. In particular, the part in which at least one filter element of the extractor hood is provided is denoted as the hood body.

The extractor hood has a control unit for controlling at least one functional unit of the extractor hood. The control unit may also be denoted as a controller. The at least one functional unit of the extractor hood, in particular, is the fan of the extractor hood or a lighting device of the extractor hood. Each functional unit may have a separate control unit. Preferably, however, all of the functional units of the extractor hood are controlled via a common control unit. The actuation, in particular the activation and deactivation of the functional unit or the setting or selection of operating states of the functional unit, is denoted as controlling the functional unit. In particular, for example, the fan setting of the fan or the brightness of the lighting device may be set by the control unit.

The extractor hood has at least one flap which is pivotably fastened to the hood body. A surface element is denoted as the flap. According to one embodiment, the flap may represent an air guidance element via which air may be conducted to the hood body and, in particular, to a suction opening in the hood body. Alternatively or additionally, the flap may also serve as a holder or panel for a control panel, a display unit or a lighting device, for example. The flap preferably represents a plate which may consist, for example, of plastic or glass.

The invention is described hereinafter substantially with reference to a flap which represents an air guidance element. However, the embodiments—if applicable—also apply to a flap which additionally or alternatively serves as a holder or panel for further elements, for example a control panel.

The flap is pivotably fastened to the hood body of the extractor hood. If the flap is an air guidance element, it may also be denoted as a vapor capture flap. If the flap is produced from glass, it may also be denoted as a glass flap or glass screen. The pivot axis, about which the flap may be pivoted, is preferably located in the horizontal plane. The pivot axis is preferably located on an edge of the hood body. As a result, by pivoting the flap outwardly the surface area via which air is conducted to a suction opening of the extractor hood may be increased. According to the invention, a plurality of flaps may be provided. For example, in each case a flap may be provided on each of the lateral edges of the hood body. Preferably, at least one flap is provided on the front edge of the hood body.

The extractor hood is characterized in that at least one sensor is arranged on the flap for detecting the state of the flap. The sensor is preferably arranged in the surface of the flap, i.e. spaced apart from the edges of the flap. For example, the sensor may be fastened to the inner surface of the flap. The fastening may be indirect or direct.

The state of the flap which is detected by the sensor may be the location or the state of movement of the flap. In particular, the relative position of the flap from the hood body may be detected in the form of an inclination angle. The state of movement may be expressed, for example, as a movement in a specific direction and/or by the speed of the movement. Additionally, the state of movement may also be expressed by the abrupt ending of a movement. As a result, sudden movements may be detected.

According to the invention, the sensor for detecting the state of the flap is an acceleration sensor. For example, the acceleration sensor may measure the acceleration due to gravity which is oriented relative to the normal to the earth's surface. The vectorial component of the acceleration due to gravity which acts on the respective sensor axis is a direct measurement of the inclination of the sensor and thus of the flap relative to the horizon. Preferably, the acceleration sensor is a multi-axis acceleration sensor. The acceleration sensor may be, for example, a capacitive acceleration sensor, a piezo-resistive or piezo-electric sensor. The acceleration sensor may be, in particular, a MEMS (micro-electro-mechanical systems) acceleration sensor. Preferably, the acceleration sensor is a 3 g acceleration sensor.

The sensor is connected to the control unit of the extractor hood. The sensor is connected to the control unit such that at least one functional unit of the extractor hood is controlled by the control unit on the basis of the detected state of the flap. This means that the functional unit is controlled on the basis of the sensor signals which indicate the state of the flap. To this end, the sensor signals may be evaluated and processed further in the control unit in order to generate control signals for the functional unit. The connection between the sensor and control unit preferably serves for transmitting sensor signals or evaluation results of the sensor signals to the control unit.

Since according to the invention at least one sensor, which is an acceleration sensor, is arranged on the flap for detecting the state of the flap, and this sensor is connected to the control unit of the extractor hood such that at least one functional unit of the extractor hood is controlled by the control unit on the basis of the detected state of the flap, a series of advantages may be achieved.

Firstly, by the use of at least one acceleration sensor, not only is it possible to detect two states of the flaps, as is the case when using a limit switch. Rather, a plurality of states, such as for example the inclination angle of the flap and/or the speed thereof, may be detected. Additionally, the construction of the extractor hood is also simplified by the potentially switch-free construction due to the use of an acceleration sensor. In particular, neither a switch nor additional cable routing to the switch, which is required for the switch, is necessary. Additionally, no additional mechanical parts are required, such as for example actuating tappets for limit switches or magnets for reed switches. Additionally, the operation of the extractor hood is simplified by the present invention. Simply by moving the flap, the user may achieve the activation, deactivation or setting of at least one functional unit of the extractor hood, such as for example the fan or the lighting. If the user opens the flap, i.e. pivots it away from the hood body, the fan of the extractor hood may be automatically set to a higher setting, for example, when the extractor hood is switched on. By pivoting the flap abruptly back and forth, for example, the lighting of the extractor hood may be switched on. The assignment of the control of the functional units to states of the flap may be stored in the control unit of the extractor hood. These states may be either predetermined by the manufacturer or selected by the user.

According to a preferred embodiment, the sensor is connected to a microcontroller which is arranged on the flap. The microcontroller may be received together with the sensor in a sensor module or provided separately to the sensor on the flap. The microcontroller serves to evaluate the acceleration values recorded by the sensor. In particular, for example, the inclination angle may be calculated in the microcontroller from the sensor signals.

According to a preferred embodiment, the sensor is integrated in a control panel which is arranged on the flap. The control panel serves, in particular, as an input element for the user. The functional units may be controlled and, for example, different presettings, for example interval-ventilation or post-ventilation, may be selected via the control panel. Additionally, the activation or deactivation of the functional units may also be selected via the control panel. The operation of the extractor hood is further simplified by the provision of an additional control panel, since the user may decide whether he wishes to operate the extractor hood via the flap or via the control panel, wherein operation via the control panel generally provides more setting options than operation via the flap. A further advantage which may be achieved by integrating the sensor in the control panel is that generally a microcontroller is provided in a control panel. When the sensor is integrated in the control panel, this microcontroller may also be used for the sensor, in particular for the evaluation of the sensor signals. The construction of the extractor hood is further simplified thereby.

According to a preferred embodiment, the flap is mounted on the front end of the hood body so as to be pivotable about a horizontal pivot axis. The end of the hood body which faces the user of the extractor hood is denoted as the front end. In the case of a wall-mounted extractor hood, therefore, the front end is the end which faces away from the mounting wall. Since the flap is provided on the front end of the hood body, this flap may serve as an air guidance element and, in the folded-out state of the flap, on the one hand fumes and vapors may be prevented from flowing past. In the folded-in state, the flap does not hinder the user. On the other hand, by attaching the flap to the front end of the hood body it is easily accessible to the user, at least in the folded-out state. Thus a control panel which is provided on the flap may be operated in a simple manner. If the hood body at the front end has a box shape, the pivot axis of the flap is preferably located on the lower edge of the box shape. Thus a pivoting of the flap inwardly, i.e. a closure of the flap, may be possible and the flap then bears against the lower face of the hood body in the closed position.

According to one embodiment, the flap extends over the entire width of the hood body. This embodiment is advantageous, in particular, in the case of a flap which represents an air guidance element. In this case, the air guidance to the hood body may be optimized by the large width of the flap in the folded-out state of the flap. If the flap represents a holder, for example for an operating element, the width of the flap may be smaller than the width of the hood body and correspond, for example, to the width of the control panel.

According to a further aspect, the invention relates to a method for operating an extractor hood according to the invention. The method is characterized in that the state of the flap is monitored via at least one acceleration sensor and, when a predetermined state is detected, at least one functional unit of the extractor hood is controlled by the control unit on the basis of the detected state of the flap.

Advantages and features which have been described relative to the extractor hood—if applicable—also apply to the method and vice versa.

According to one embodiment, the state of the flap is the position relative to the hood body, in particular an inclination angle.

Additionally or alternatively, the state of the flap may be the speed of movement and/or the direction of movement of the flap.

The functional unit which is controlled on the basis of a detected state is preferably the fan of the extractor hood or a lighting unit of the extractor hood.

BRIEF DESCRIPTION OF THE DRAWINGS

The invention is described again hereinafter with reference to the accompanying figures, in which.

DETAILED DESCRIPTION OF EXEMPLARY EMBODIMENTS OF THE PRESENT INVENTION

Figure 1:
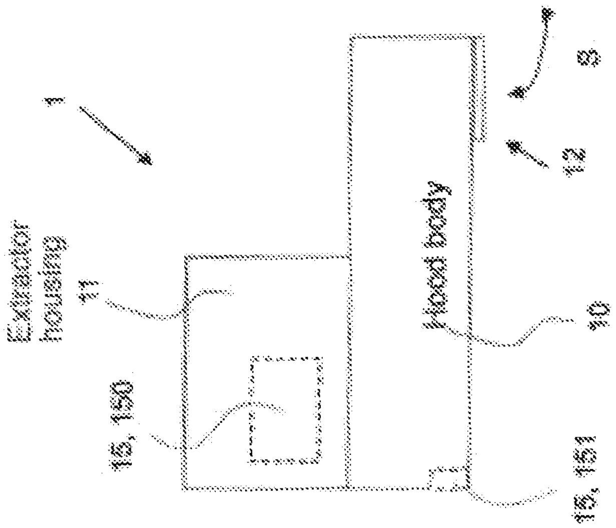
FIG. 1: shows a schematic side view of an embodiment of the extractor hood according to the invention in a first operating state.

In FIG. 1 an embodiment of the extractor hood 1 according to the invention is shown in side view. In the embodiment shown, the extractor hood 1 consists of a hood body 10 and an extractor housing 11 extending upwardly from the hood body 10. A fan 150 which represents a functional unit 15 of the extractor hood 1 is arranged in the extractor housing 11 of the extractor hood 1. The hood body 10 has a box shape so that the extractor hood 1 may also be denoted as a box chimney hood. A further functional unit 15 of the extractor hood 1 is arranged in the rear region of the hood body 10. This functional unit 15 represents a lighting device 151 via which for example a hob (not shown) located below the extractor hood 1 may be illuminated. At the front end of the hood body 10 a flap, which in the embodiment shown represents an air guidance element 12, is shown on the lower face of the hood body 10. In the first operating state shown in FIG. 1, the air guidance element 12 bears against the lower face of the hood body 10. The front end of the air guidance element 12 is flush with the front face of the hood body 10. The air guidance element 12, which is also denoted as a flap, is pivotably fastened to the hood body 10. The pivot axis, about which the air guidance element 12 may be pivoted, is located in the horizontal plane and extends along the lower edge of the front face of the hood body 12. The position of the air guidance element 12, which is shown in FIG. 1, may also be denoted as the folded-in or closed position. The air guidance element 12 thus may be moved in the pivoting direction S shown in FIG. 1.

Figure 2:
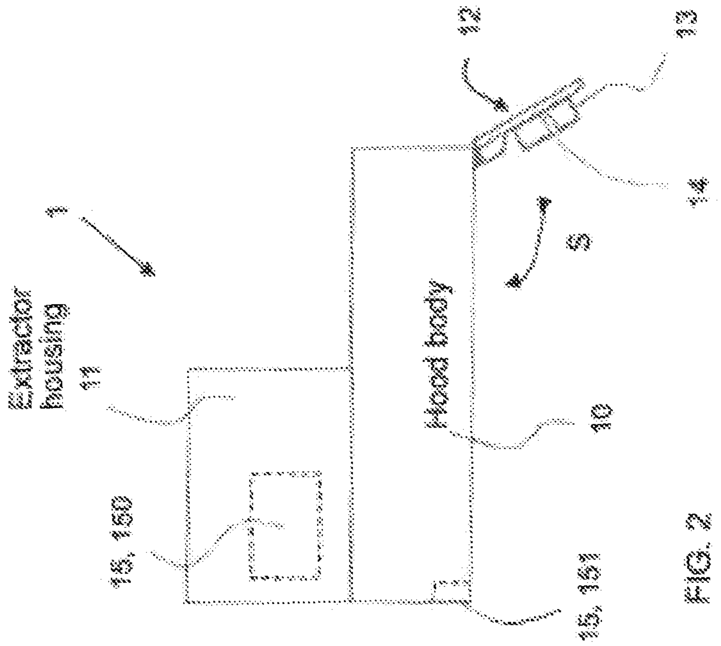
FIG. 2: shows a schematic side view of the embodiment of the extractor hood according to the invention according to FIG. 1 in a second operating state.

If the air guidance element 12 is pivoted to the front from the operating state of the extractor hood 1, shown in FIG. 1, this air guidance element may be moved into the position shown in FIG. 2. This position is also denoted as a folded-out or open position. The air guidance element 12 may also be pivoted further forward beyond the position shown in FIG. 2.

As is also revealed in FIG. 2, a control panel 13 is arranged on the inner face of the air guidance element 12. The side of the air guidance element 12 which is oriented upwardly in the position in FIG. 1 is denoted as the inner face.

Additionally, a sensor 14 is arranged on the air guidance element 12. The sensor 14 represents an acceleration sensor. In the embodiment shown in the figures, the sensor 14 is integrated in the control panel 13.

Figure 3:
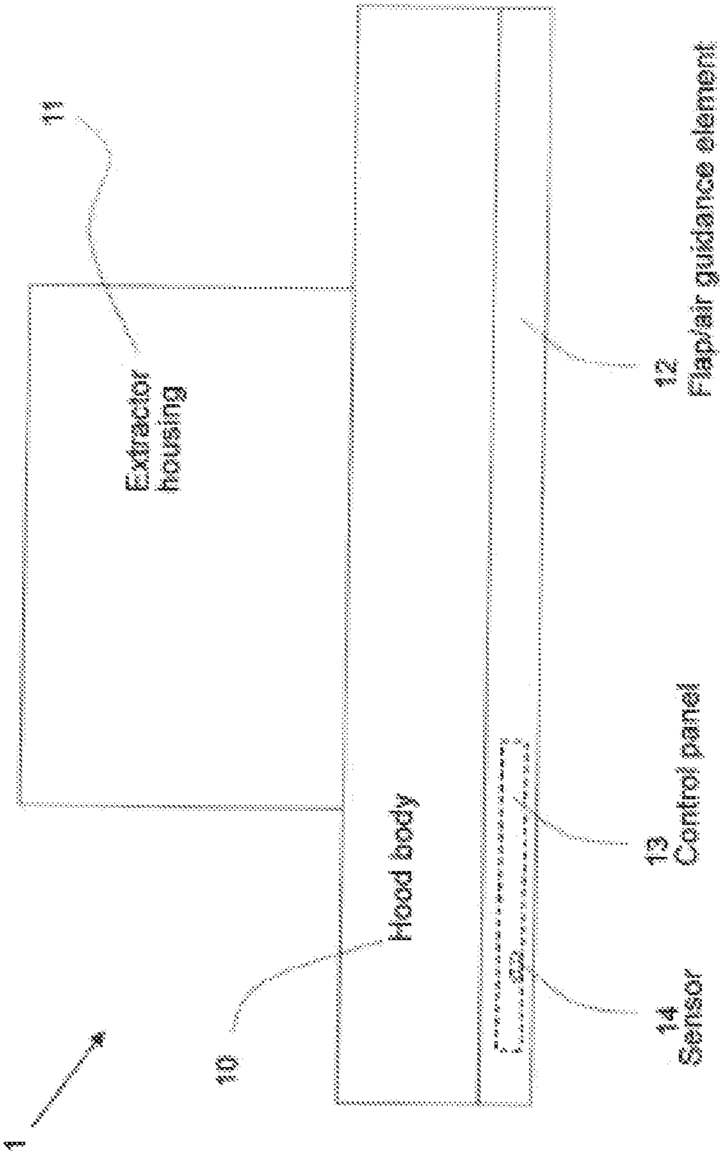
FIG. 3: shows a schematic front view of the embodiment of the extractor hood according to the invention according to FIG. 1 in the second operating state.

As is revealed from the front view of the extractor hood 1, which is shown in FIG. 3, the air guidance element 12 extends over the entire width of the hood body 10. In the embodiment shown, the control panel 13 is arranged offset to the side relative to the center of the air guidance element 12. The control panel 13 may, however, also be arranged in the center of the width of the air guidance element 12.

By means of the present invention it is possible to detect the position or the inclination angle of the flap, which may also be denoted as a glass screen or vapor capture flap, of an extractor hood. According to the inclination/position, i.e. depending on whether this is open, closed or in another position, various actions such as for example switching the light of the appliance on or off or further actions may be triggered without having to use an electromechanical or contactless switch (limit switch, microswitch, reed contact switch or the like) therefor.

Preferably, the control panel of the extractor hood is equipped with an acceleration sensor (3 g sensor) which is evaluated by means of a microcontroller or the existing control panel microcontroller. In particular, a control panel-electronics with an integrated 3 g sensor, by which different angular positions of the glass screen/vapor capture flap may be detected and evaluated, may be provided on the glass screen/vapor capture flap. By means of the detected acceleration values, it is possible to calculate the location, in particular the position or the inclination angle, of the control panel which is fastened to the glass screen/vapor capture flap, and thus also the inclination angle of the glass screen/vapor capture flap. By means of this information, therefore, according to the inclination/position of the glass screen/vapor capture flap, various functions/actions, for example switching the light on and off, changing the fan setting, may be performed as a function of the flap position.

The present invention has a series of advantages. In particular, an additional switch is not required for detecting the glass screen/vapor capture flap position. This means that additional cable routing is not required and thus a cost saving is achieved. Moreover, additional mechanical parts, such as for example actuating tappets, magnets for reed switches and the like, are not required. The sensor, for example a 3 g sensor, may be integrated in the control electronics and evaluated by the control panel microcontroller. Additionally, different angular positions of the glass screen/vapor capture flap may be detected. An evaluation of the speed of movement or acceleration is also possible. Thus, for example, with a sudden movement of the flap, a specific action may be additionally performed.

The invention claimed is:

1. An extractor hood, comprising:

a fan;

a control unit configured to control the fan;

a hood body;

a flap pivotably fastened to the hood body, such that the flap is configured to selectively pivot relative to the hood body between a plurality of positions including a plurality of intermediate positions between an open position and a closed position; and an acceleration sensor disposed on the flap and configured to detect a current flap position of the flap relative to the hood body and a speed of movement of the flap, wherein the current flap position is one of the plurality of positions, and wherein the control unit is configured to control the fan based on the current flap position and the speed of movement of the flap.

2. The extractor hood of claim 1, wherein the acceleration sensor is a 3 g acceleration sensor.

3. The extractor hood of claim 1, further comprising a microcontroller arranged on the flap, wherein the acceleration sensor is connected to the microcontroller.

4. The extractor hood of claim 1, further comprising a control panel arranged on the flap, wherein the acceleration sensor is integrated into the control panel.

5. The extractor hood of claim 1, wherein the flap is mounted on a front end of the hood body, such that the flap is pivotable about a horizontal pivot axis.

6. The extractor hood of claim 5, wherein the flap is sized to extend over an entire width of the hood body.

7. The extractor hood of claim 1, wherein the control unit is configured to control activation and deactivation of the fan based on the current flap position of the flap.

8. The extractor hood of claim 1, wherein the control unit is configured to control a speed of the fan based on the current flap position of the flap.

9. The extractor hood of claim 1, wherein the current flap position of the flap comprises an inclination angle of the flap relative to the hood body.

10. The extractor hood of claim 1, wherein the acceleration sensor is further configured to detect a direction of movement of the flap, and wherein the control unit is further configured to control the fan based on the direction of movement of the flap.

11. The extractor hood of claim 1, wherein the fan is configured to suction air into the hood body.

12. The extractor hood of claim 1, wherein the flap comprises an air guidance element configured to guide air into the hood body.

13. The extractor hood of claim 1, wherein the acceleration sensor is a multi-axis acceleration sensor.

14. A method for operating an extractor hood which comprises a hood body and a flap pivotably fastened to the hood body, the method comprising:

monitoring a current flap position of the flap relative to the hood using an acceleration sensor, wherein the current flap position is one of a plurality of positions of the flap including a plurality of intermediate positions between an open position and a closed position;

in response to detecting the current flap position being a predetermined one of the plurality of positions, controlling a fan of the extractor hood by a control unit of the extractor hood based on the current flap position of the flap; and monitoring a speed of movement of the flap, and further controlling the fan based on the speed of movement of the flap.

15. The method of claim 14, wherein the current flap position of the flap comprises an inclination angle of the flap relative to the hood body.

16. The method of claim 14, further comprising monitoring a direction of movement of the flap, and controlling the fan based on the direction of movement of the flap.

17. The method of claim 14, wherein controlling the fan by the control unit comprises controlling activation and deactivation of the fan based on the current flap position of the flap.

18. The method of claim 14, wherein controlling the fan by the control unit comprises controlling a speed of the fan based on the current flap position of the flap.

* * * * *